United States Patent
Takahashi

(10) Patent No.: US 8,400,723 B2
(45) Date of Patent: Mar. 19, 2013

(54) LENS BARREL HAVING AN ECCENTRICITY ADJUSTING MECHANISM

(75) Inventor: Satoshi Takahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 35 days.

(21) Appl. No.: 13/208,782

(22) Filed: Aug. 12, 2011

(65) Prior Publication Data

US 2012/0038992 A1 Feb. 16, 2012

(30) Foreign Application Priority Data

Aug. 13, 2010 (JP) ................. 2010-181437

(51) Int. Cl.
*G02B 7/02* (2006.01)
*G02B 15/14* (2006.01)

(52) U.S. Cl. .......... 359/822; 359/819; 359/694; 359/704

(58) Field of Classification Search .......... 359/694–704, 359/811–830
See application file for complete search history.

(56) References Cited

U.S. PATENT DOCUMENTS

| | | | |
|---|---|---|---|
| 5,717,528 A | 2/1998 | Ihara et al. | |
| 6,204,979 B1 | 3/2001 | Matsui | |
| 6,515,807 B2 * | 2/2003 | Noguchi | 359/694 |
| 7,420,748 B2 * | 9/2008 | Koyama | 359/703 |
| 2006/0045502 A1 | 3/2006 | Sato | |

FOREIGN PATENT DOCUMENTS

| | | |
|---|---|---|
| JP | 11-174301 | 7/1999 |
| JP | 2000-066076 | 3/2000 |
| JP | 2000-075182 | 3/2000 |

OTHER PUBLICATIONS

Extended European Search Report issued Dec. 6, 2011 by the European Patent Office in European Patent Application No. 11177321.4, 5 pages.

* cited by examiner

*Primary Examiner* — Mohammed Hasan
(74) *Attorney, Agent, or Firm* — Young & Thompson

(57) ABSTRACT

According to an aspect of the invention, a lens barrel having an eccentricity adjusting mechanism includes a lens frame, a pressing ring, an engaging part, a tool insertion hole, an engaging face, a non-engaging face. The lens frame holds a lens for an optical system of the lens barrel. The pressing ring is screw-connected to a fixed barrel of the lens barrel. A part of the lens frame is disposed between the pressing ring and the fixed barrel so that the lens frame is supported to be rotatable around the optical axis. The engaging part is formed on an outer circumferential face of the lens frame, protrudes from the outer circumferential face of the lens frame, the engaging part including a plurality of engaging parts formed in the circumferential direction of the outer circumferential face of the lens frame with predetermined intervals.

6 Claims, 5 Drawing Sheets ately held in an outer lens frame are held as lenses to be subjected to eccentricity adjustment in an inner lens frame disposed in the inside of the outer lens frame. The outer lens frame is axially supported by an eccentric pin engaged with the inner lens frame. The eccentric pin is rotated through a hole penetrating from the outside of the barrel to the eccentric pin, thereby adjusting a slant angle of the lenses in the inner lens frame.

According to the eccentricity adjusting mechanism of JP-A-2000-75182, a lens group having a plurality of lenses is held in the outer lens frame, as in JP-A-2000-66076. Some of the lens groups are held as lenses to be subjected to eccentricity adjustment in the inner lens frame. A gear is provided on the circumferential surface of the inner lens frame. The inner lens frame is rotated by a rotating means engaged with the gear through an aperture penetrating from the outside of the barrel to the gear, thereby adjusting rotation of the lenses of the inner lens frame around the optical axis.

According to the eccentricity adjusting mechanism of JP-A-H11-174301, an exposed part is provided in a lens frame holding lenses to be subjected to eccentricity adjustment in the direction orthogonal to the optical axis, and exposed from the outside of the barrel. The exposed part is displaced by an adjustment jig, thereby adjusting the position of the lenses in the direction orthogonal to the optical axis.

However, if eccentricity adjustment is carried out by rotating the lens frame around the optical axis as in Patent Document 2, the rotation direction may be problematic. For example, in case of rotating the outer lens frame (referred to as simply the "lens frame") itself, rather than the inner lens frame disposed in the outer lens frame, sandwiching a predetermined site of the lens frame between a predetermined site of the fixed barrel and a pressing ring screw-connected to the fixed barrel has been known as a structure for rotatably supporting the lens frame to the fixed barrel. In the structure for supporting the lens frame, when the lens frame is rotated around the optical axis, if the lens frame is rotated in a direction to loosen the pressing ring screw-connected to the fixed barrel, the rotating force of the lens frame is transferred to the pressing ring so that the pressing ring may be loosened. If the pressing ring is loosened, the lens frame clatters in the optical axis direction so that the optical performance is deteriorated. If this problem occurs when eccentricity adjustment is carried out in the state that all lenses are fitted in the fixed barrel, one should undergo hard works for disassembling the lens barrel and engaging the pressing ring once again.

With respect to a method for regulating the lens frame to be rotated in one direction upon eccentricity adjustment, providing a ratchet mechanism between the pressing ring and the lens frame may be considered. However, providing the ratchet mechanism increases manufacturing costs. Further, the lens frame may easily clatter in the optical axis direction due to vibration or other causes, thereby causing deterioration of the optical performance. Accordingly, it is desirable to regulate (restrain) the rotation of the lens frame in the direction to loosen the pressing ring, without providing a special mechanism.

The present invention has been made in consideration of the circumstances, and its object is to provide a lens barrel having an eccentricity adjusting mechanism, in which a lens frame holding lenses to be rotated for eccentricity adjustment is rotatably supported to a fixed barrel by a pressing ring screw-connected to the fixed barrel, such that upon the eccentricity adjustment, a worker is restrained from rotating the lens frame in the direction to loosen the pressing ring screw-connected to the fixed barrel, thereby preventing the pressing ring from being loosened due to the eccentricity adjustment.

SUMMARY OF INVENTION

[1] According to an aspect of the invention, a lens barrel having an eccentricity adjusting mechanism includes a lens frame, a pressing ring, an engaging part, a tool insertion hole, an engaging surface, a non-engaging surface. The lens frame holds a lens for an optical system of the lens barrel. The pressing ring is screw-connected to a fixed barrel of the lens barrel. A part of the lens frame is disposed between the pressing ring and the fixed barrel so that the lens frame is supported to be rotatable around the optical axis. The engaging part is formed on an outer circumferential face of the lens frame and protrudes from the outer circumferential face of the lens frame. The tool insertion hole penetrates from an outside of the fixed barrel of the lens barrel to the position of the engaging part in the diameter direction. A tool is inserted into the tool insertion hole to be engaged with a side face of a circumferential direction side of the engaging part so that the lens frame is rotated around the optical axis and eccentricity adjustment for lenses held in the lens frame is carried out. The engaging face is a side face of the circumferential direction side of the engaging part, is formed in the rotation direction to loosen the pressing ring screw-connected to the fixed barrel, and is engageable with the tool to rotate the lens frame in a rotation direction to tighten the pressing ring. The non-engaging face is a side face of the circumferential direction side of the engaging part, is formed in the rotation direction to tighten the pressing ring screw-connected to the fixed barrel, and is not engageable with the tool to prevent the lens frame from rotating in the rotation direction to loosen the pressing ring.

[2] In the lens barrel having an eccentricity adjusting mechanism of [1], the engaging surface is substantially vertical to the outer circumferential surface of the lens frame, and the non-engaging surface is obliquely slanted from a direction vertical to the outer circumferential surface of the lens frame.

[3] In the lens barrel having an eccentricity adjusting mechanism of [1] or [2], the non-engaging surface is obliquely slanted about 45° from the direction vertical to the outer circumferential surface of the lens frame.

[4] In the lens barrel having an eccentricity adjusting mechanism of any one of [1] to [3], the tool insertion hole is formed at an upper position than the optical axis in the state that the lens barrel is installed in a measuring device for eccentricity adjustment, and a position where the engaging part is moved from an upward to a downward when the lens frame is rotated in the direction to tighten the pressing ring.

[5] In the lens barrel having an eccentricity adjusting mechanism of any one of [1] to [4], the tool insertion hole is formed over the substantially same range as an interval angle of the adjacent engaging parts based on an azimuth angle viewed at a point on the optical axis on a cross-section surface vertical to the optical axis.

[6] In the lens barrel having an eccentricity adjusting mechanism of [1] to [5], the engaging part includes a plurality of engaging parts formed in the circumferential direction of the outer circumferential face of the lens frame with predetermined intervals.

According to the present invention, even if a worker attempts to rotate the lens frame holding lenses for eccentricity adjustment in the direction to loosen the pressing ring screw-connected to the fixed barrel, a side surface of an engaging part to be engaged with a tool upon the rotation is a non-engaging surface so that the engagement cannot be accomplished. Accordingly, rotating the lens frame in the direction to loosen the pressing ring is restrained. If the worker attempts to rotate the lens frame in a direction to tighten the pressing ring, a side surface of the engaging part to be engaged with a tool upon the rotation is an engaging surface so that the engagement can be accomplished. Accordingly, the eccentricity adjustment can be carried out by rotating the lens frame in the direction to tighten the pressing ring.

The present invention provides a specific embodiment of the engaging surface and the non-engaging surface of the engaging part. A side surface of the engaging part is vertical to the outer circumferential surface of the lens frame so that it serves as the engaging surface that can be engaged with a tool. The other side surface of the engaging part is obliquely slanted so that it serves as the non-engaging surface that cannot be engaged with a tool. With this configuration, the rotation direction of the lens frame is limited to one direction.

The present invention provides one embodiment of a desirable slant angle of the non-engaging surface.

The present invention provides an embodiment for more effectively restraining the rotation of the lens frame in the direction to loosen the pressing ring by using a position of a tool insertion hole.

The present invention provides an embodiment wherein a tool insertion hole is formed as small as possible to prevent dusts or others from entering into the fixing barrel under the condition that the rotatable adjustment of the lens frame can be properly performed.

According to the present invention, in the lens barrel, in which the lens frame holding lenses to be rotated for eccentricity adjustment is rotatably supported to the fixed barrel by the pressing ring screw-connected to the fixed barrel, a worker is restrained from rotating the lens frame in the direction to loosen the pressing ring screw-connected to the fixed barrel upon the eccentricity adjustment. Accordingly, the pressing ring can be prevented from being loosened due to the eccentricity adjustment.

DETAILED DESCRIPTION

Hereinafter, an embodiment of the lens barrel having an eccentricity adjusting mechanism according to the present invention will be described with reference to the accompanying drawings.

Figure 1:
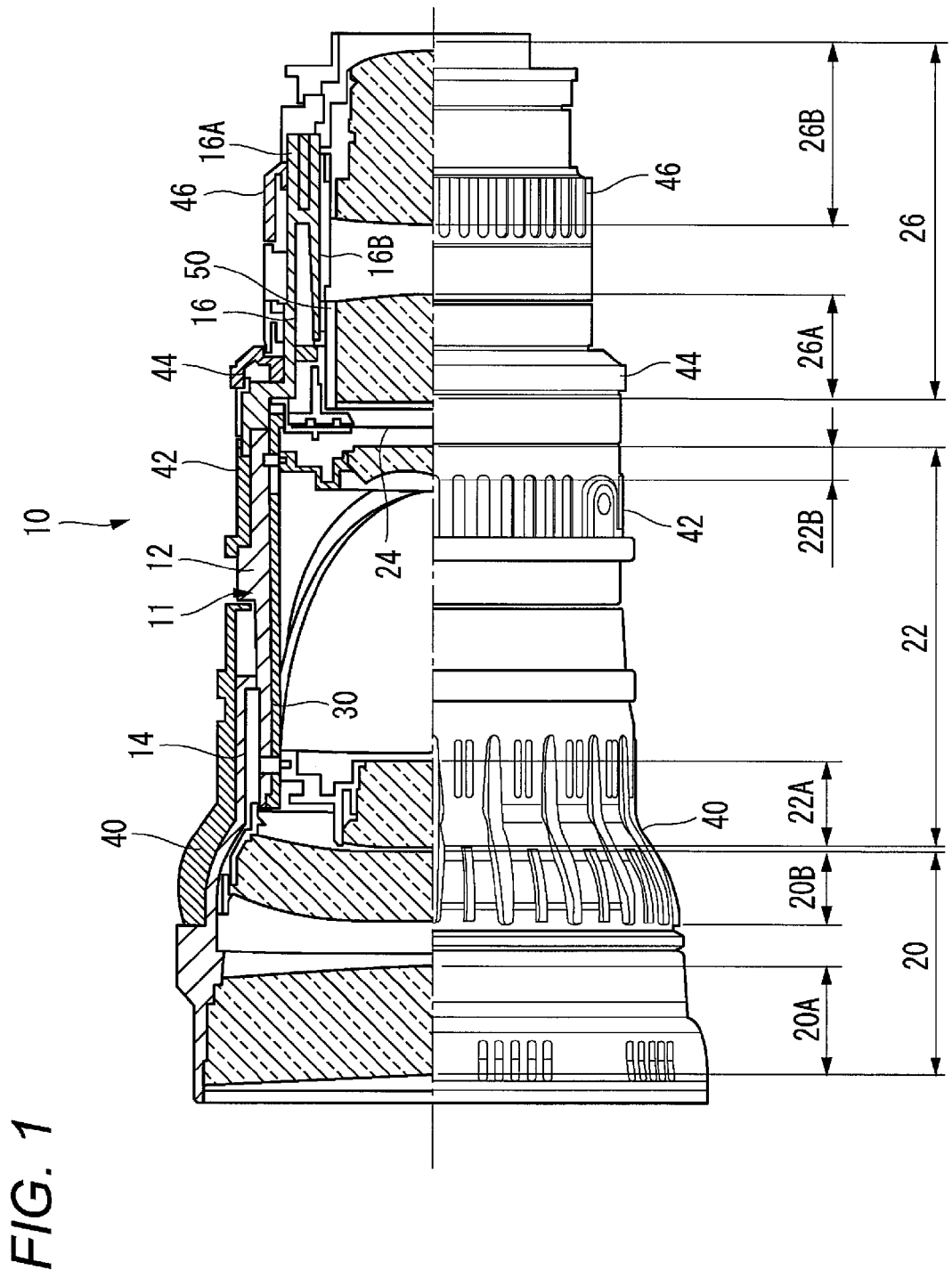
FIG. 1 is a side view showing a partial cross-section of a lens barrel, to which the present invention is applied.

FIG. 1 is a side view showing a partial cross-section of a lens barrel, to which the present invention is applied. The lens barrel 10 of FIG. 1 is an inner focus type of a lens barrel mounted by a mount in an interchangeable lens camera known as an ENG (Electric News Gathering) camera carried to gather news or others for the purpose of broadcasting or business.

The lens barrel 10 has an immovable fixed barrel 11 integrally connected by screws or others to the lens barrel 10. The fixed barrel 11 has a central fixed barrel 12 substantially in the center of the fixed barrel 11, a front fixed barrel 14 fixed to the central fixed barrel 12 and disposed at the front side of the fixed barrel 11, and a rear fixed barrel 16 fixed to the central fixed barrel 12 and disposed at the rear side of the fixed barrel 11.

Optical systems for receiving object light and forming an image are disposed in the fixed barrel 11. As well-known, the optical systems have a focus optical system 20, a zoom optical system 22, an iris 24, and a master optical system 26 in order from the front end side along the optical axis (an object side in the optical axis direction).

The focus optical system 20 is an optical system for adjusting an object distance to adjust a focus, i.e., a focus position (focus adjustment), and includes a fixed focus lens group 20A fixed at a certain position and a moving focus lens group 20B supported to be forwardly and backwardly movable in the optical axis direction. The moving focus lens group 20B moves so that the focus position varies.

The zoom optical system 22 is an optical system for adjusting a zoom ratio, i.e., a focus distance, and includes a ratio conversion system lens group 22A and a correction system lens group 22B, which are supported to be forwardly and backwardly movable in the optical axis direction. The ratio conversion system lens group 22A moves so that the focus distance varies. The correction system lens group 22B moves so that the variation of the focus position due to the movement of the ratio conversion system lens group 22A is suppressed. The ratio conversion system lens group 22A and the correction system lens group 22B cooperatively move in accordance with a position relation predetermined by a cam mechanism of a cam barrel 30.

The iris 24 operates iris blades to be open and closed for adjustment of a light quantity thereby varying an aperture diameter.

The master optical system 26 is an optical system for finally forming an image and includes a front mater lens group 26A and a rear mater lens group 26B. The front master lens group 26A is fixed at a certain position. The rear master lens group 26B is movably supported along the optical axis for adjustment of a back focus or other purposes.

Meanwhile, the fixed barrel 11 has a focus driving mechanism, a zoom driving mechanism, an iris driving mechanism, and a master driving mechanism for driving the movably supported moving focus lens group 20B, the zoom optical system 22 (the ratio conversion system lens group 22A and the correction system lens group 22B), the iris 24, and the rear master lens group 26B, respectively.

Description of details of the driving mechanisms is omitted herein. However, a focus ring 40, a zoom ring 42, an iris ring 44, and a back focus adjusting ring 46 are rotatably disposed on the outer circumferential part of the fixed barrel 11. The focus driving mechanism is configured to enable the moving focus lens group 20B to forwardly and backwardly move in the optical axis direction due to a rotating force of the focus ring 40. The zoom driving mechanism is configured to enable the zoom optical system 22 to forwardly and backwardly move in the optical axis direction due to a rotating force of the zoom ring 42. The iris driving mechanism is configured to enable the iris 24 to be open and closed due to a rotating force of the iris ring 44. The master driving mechanism is configured to enable the rear master lens group 26B to forwardly and backwardly move in the optical axis direction due to a rotating force of the back focus adjusting ring 46.

Hereinafter, an eccentricity adjusting mechanism provided in the lens barrel 10 will be described. The lens barrel 10 has an eccentricity adjusting mechanism for carrying out eccentricity adjustment by rotatably adjusting the front master lens group 26A as a whole around the optical axis as lenses largely influencing the optical performance of all the optical systems.

Figure 2:
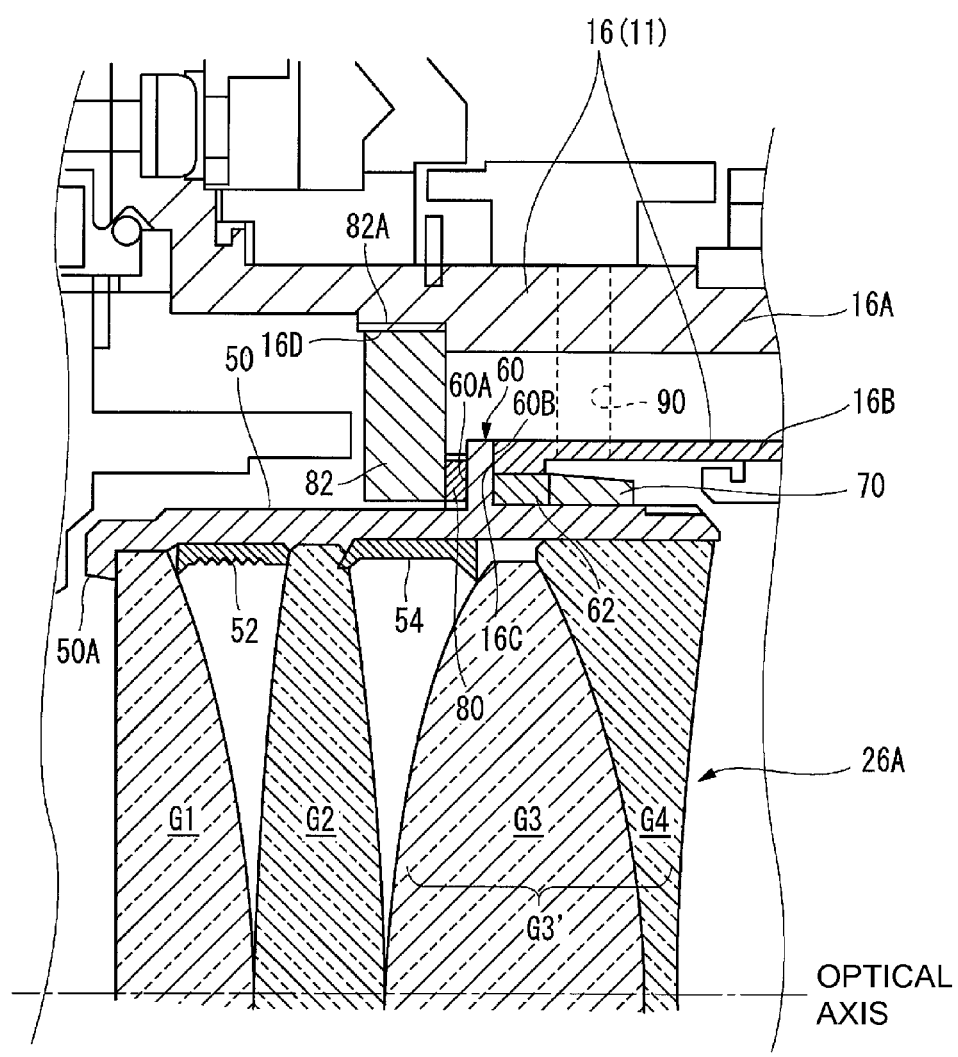
FIG. 2 is an enlarged cross-sectional view showing configuration of the periphery of a front master lens group, on which an eccentricity adjusting mechanism of the present invention is provided.

FIG. 2 is an enlarged cross-sectional view showing configuration of the periphery of the front master lens group 26A. As illustrated in FIG. 2, the front master lens group 26A is configured by four lenses (single lenses) G1 to G4. The lenses G3 and G4 are jointed on their facing surface to construct a couple of lenses (doublet lens) G3'.

The lenses G1, G2, and G3' of the front master lens group 26A are held in the lens frame 50 such that they are disposed in the fixed barrel 11 (the rear fixed barrel 16).

The lens frame 50 is in a cylindrical form, for example, made of plastic. On the front end part of the lens frame 50, the engaging part 50A inwardly projected in the diameter direction is provided. Upon fitting the front master lens group 26A, the lenses G1, G2, and G3' are inserted from a rear aperture of the lens frame 50. The lens G1 is first inserted into the lens frame 50 such that the front side edge of the lens G1 is engaged and contained in the engaging part 50A. Thereafter, an interval ring 52, the lens G2, an interval ring 54, and the lens G3' are inserted in order. The rear side edge of the lens G3' is fixed to the rear end part of the lens frame 50 by an adhesive means such as thermal caulking. Meanwhile, the present invention can be applied, no matter what configuration the front master lens group 26A and the inside of the lens frame 50 have.

Figure 3:
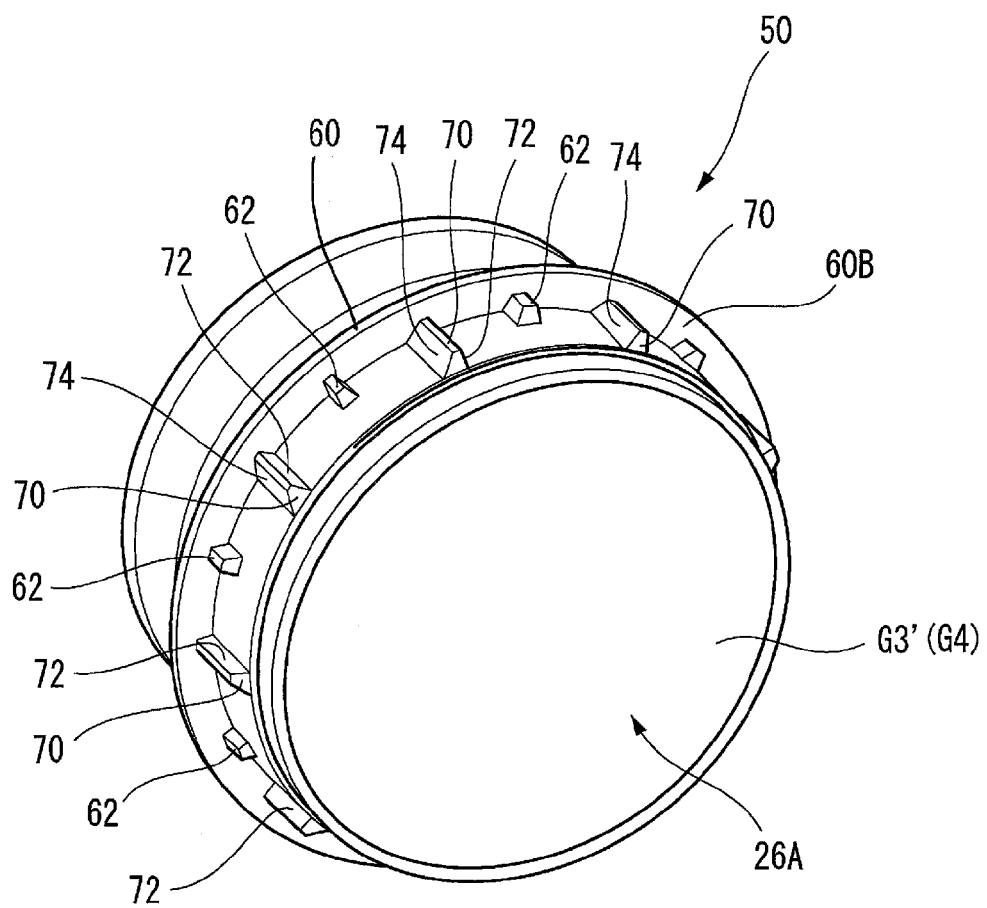
FIG. 3 is a perspective view showing appearance of the lens frame of the front master lens group when viewed at a rear side.

FIG. 3 is a perspective view showing appearance of the lens frame 50 when viewed at a rear side. As illustrated in FIGS. 2 and 3, on the outer circumferential surface of the lens frame 50, a flange part 60 in a circular ring is formed along the circumferential direction while being outwardly projected in the diameter direction. The flange part 60 has a front side wall surface 60A and a rear side wall surface 60B, which are orthogonal to the optical axis. At positions past the rear side wall surface 60B on the outer circumferential surface of the lens frame 50, a projection 62 and a ridge 70 are alternatively formed along the circumferential direction, while being outwardly projected in the diameter direction.

The cross-section of the projection 62 orthogonal to the optical axis has an outer front end in a circular curved shape. The projection 62 is extended from the position of the rear side wall surface 60B along the optical axis direction within a range near the rear side wall surface 60B.

The ridge 70 is extended from the position of the rear side wall surface 60B along the optical axis direction in a longer range than the projection 62. The shape of the ridge 70 will be described hereafter.

The projection 62 and the ridge 70 are provided at positions along the circumferential direction with certain intervals. The ridge 70 is positioned in the middle of the adjacent two projections 62.

The lens frame 50 is supported to the rear fixed barrel 16. As illustrated in FIGS. 1 and 2, the rear fixed barrel 16 has the structure wherein the outer cylinder 16A and the inner cylinder 16B disposed in the outer cylinder 16A are partially connected and integrally formed.

As illustrated in FIG. 2, the lens frame 50 is inserted from a front aperture of the inner cylinder 16B and fitted in the inner cylinder 16B. The lens frame 50 enters up to the position where the rear side wall surface 60B of the flange part 60 projected on the outer circumferential surface of the lens frame 50 contacts the front end surface 16C of the inner cylinder 16B. Accordingly, the front end of the projection 62 projected on the outer circumferential surface of the lens frame 50 is pressed onto the inner circumferential surface of the front end part of the inner cylinder 16B, so that the lens frame 50 is supported to the inner cylinder 16B, i.e., the rear fixed barrel 16.

Subsequently, a circular plate spring 80 is fitted on the outer circumferential part of the lens frame 50 to be in contact with the front side wall surface 60A of the flange part 60. Thereafter, a circular pressing ring 82 is screwed to be screw-connected to the inner circumferential surface of the outer cylinder 16A of the rear fixed barrel 16 so that a screw part 82A formed on the outer circumferential surface of the pressing ring 82 is screw-connected to a screw part 16D formed on the inner circumferential surface of the outer cylinder 16A. The pressing ring 82 is rotated in the clockwise direction (the direction of rotation of the right-hand thread) when viewed at the front side (object side) of the optical axis direction so that it enters into the outer cylinder 16A and reaches an end part where the entering is restricted. Accordingly, the plate spring 80 is sandwiched between the pressing ring 82 and the front side wall surface 60A of the flange part 60 of the lens frame 50. Due to elastic transformation of the plate spring 80, the rear side wall surface 60B of the flange part 60 of the lens frame 50 is pressed onto the front end surface 16C of the inner cylinder 16B. Accordingly, the lens frame 50 is positioned in the optical axis direction by the front end surface 16C of the inner cylinder 16B. The front master lens group 26A held in the lens frame 50 is positioned at a predetermined position in the optical axis direction. Meanwhile, the present invention can be applied to the case of using other types of elastic members such as rubber, instead of the plate spring 80, or pressing the pressing ring 82 directly onto the flange part 60 of the lens frame 50 without interposing an elastic member such as the plate spring 80. The structure for rotatably supporting the lens frame (the lens frame for rotatable adjustment) holding lenses for eccentricity adjustment to the fixed barrel is not limited to the structure of the present embodiment. The present invention can be effectively applied to any structure if the structure relates to sandwiching a predetermined site of the lens frame 50 between a predetermined site of the fixed barrel and a pressing ring screw-connected to the fixed barrel.

A penetration hole 90 (details thereof will be described hereafter) in a hole shape elongated in the circumferential direction is formed such that it penetrates from the outside of the rear fixed barrel 16 to the position of the ridge 70 of the lens frame 50 in the state that the lens frame 50 is supported to the rear fixed barrel 16. A tool having a leading end part in a flat plate shape such as a minus driver is inserted into the penetration hole 90 so that the leading end part is engaged with the ridge 70 of the lens frame 50 and operated in a predetermined direction. Accordingly, the lens frame 50 is rotated around the optical axis, so that the eccentricity adjustment can be carried out. If the lens frame 50 is rotated in a direction opposite to the rotation direction of the lens frame 50 when the pressing ring 82 is screwed (engaged) with the outer cylinder 16A of the rear fixed barrel 16 (the clockwise direction when viewed at the front side of the optical axis direction), the pressing ring 82 also is rotated in the same direction via the plate spring 80. Accordingly, the pressing ring 82 is loosened, so that the lens frame 50 would clatter in the optical axis direction. Accordingly, a structure for regulating the rotation of the lens frame 50 in the direction to loosen the pressing ring 82 is provided. Hereinafter, the structure for regulating the rotation direction of the lens frame 50 will be described.

Figure 4:
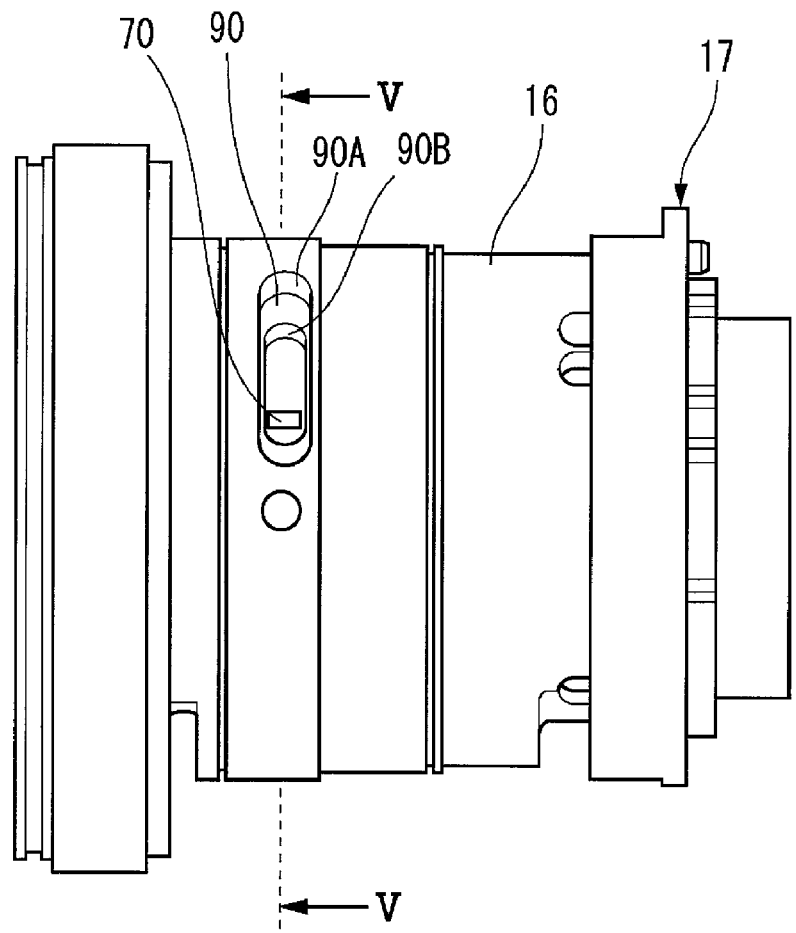
FIG. 4 is a side view showing appearance of a rear fixed barrel in the state that a lens frame of the front master lens group is held in the rear fixed barrel.
Figure 5:
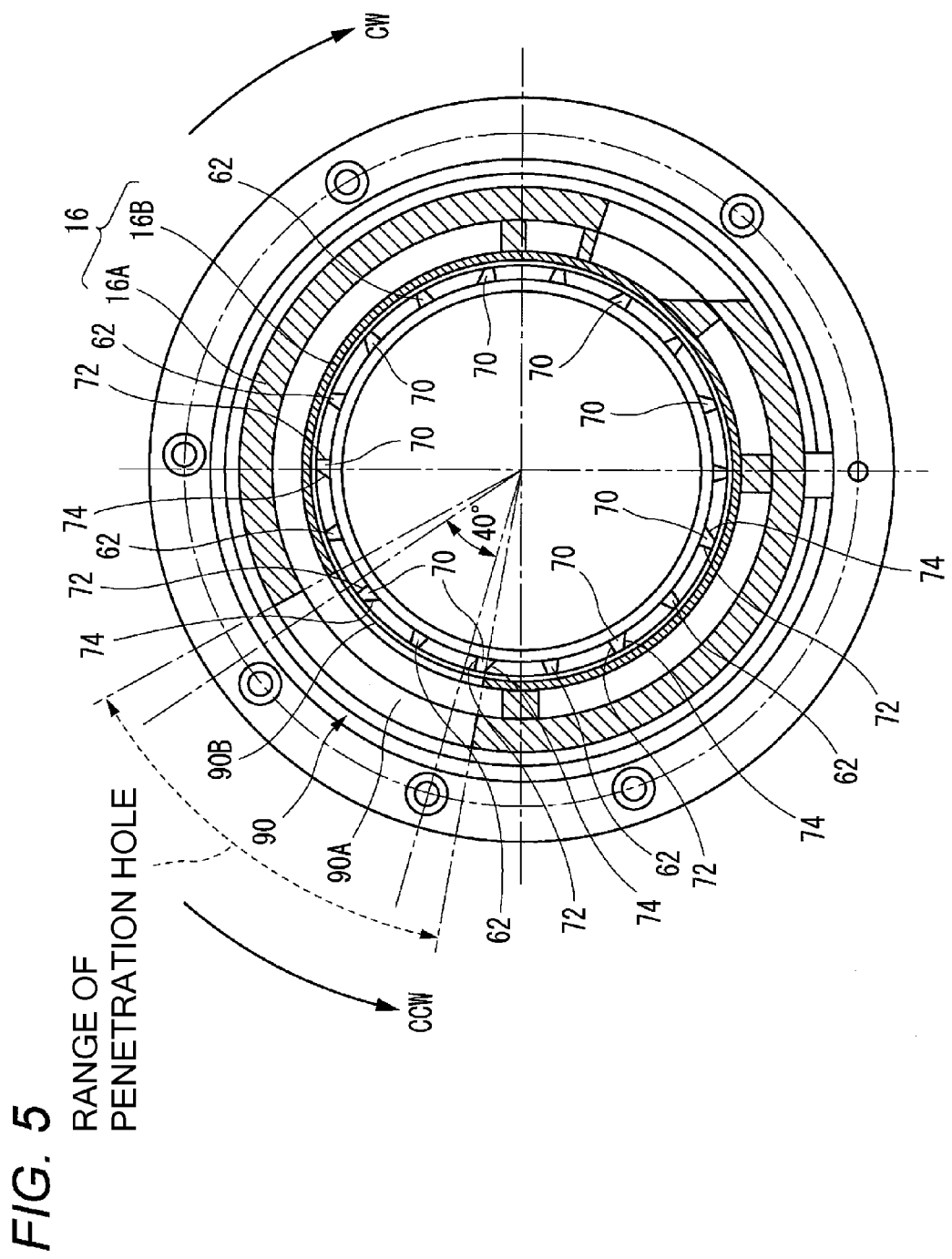
FIG. 5 is a cross-sectional view showing a cross-section of the lens frame orthogonal to the optical axis at positions where ridges are formed (a position where a penetration hole is formed) when viewed at a rear side in the optical axis direction (a cross-sectional view of the V-V line in FIG. 4).

FIG. 4 is a side view showing appearance of the rear fixed barrel 16 in the state that the lens frame 50 is held in the rear fixed barrel 16. FIG. 5 is a cross-sectional view showing a cross-section of the lens frame 50 orthogonal to the optical axis at positions where the ridges 70 are formed (the position of the penetration hole 90) when viewed at a rear side in the optical axis direction (a cross-sectional view of the V-V line in FIG. 4).

As illustrated in FIGS. 4 and 5, the rear fixed barrel 16 has the penetration hole 90 penetrating from the outside of the rear fixed barrel 16 to the position of the ridge 70 of the lens frame 50. The penetration hole 90 is formed with penetration holes 90A and 90B formed on the outer cylinder 16A and the inner cylinder 16B of the rear fixed barrel 16, respectively, and a cavity part where no member has been originally disposed. The penetration hole 90 is formed in the optical axis direction over the range past the projection 62 within the range where the ridge 70 is formed. Accordingly, the projection 52 cannot be seen from the outside of the rear fixed barrel 16 through the penetration hole 90. As illustrate in FIG. 4, only the ridge 70 can be seen. The penetration hole 90 will be described in detail hereafter.

Meanwhile, a member 17 mounted on the rear end of the rear fixed barrel 16 in FIG. 5 corresponds to a mount ring for mounting the lens barrel 10 in a camera. As illustrated in FIG. 1, a member such as a back focus adjusting ring 46 or a decoration ring is fitted outside the rear fixed barrel 16. However, FIGS. 4 and 5 do not illustrate such a member. Since the member can be easily detached from the rear fixed barrel 16 without dissembling the lens barrel 10, the eccentricity adjusting work is carried out in the state that the member is separated from the rear fixed barrel 16. Accordingly, the penetration hole 90 also is not formed on the member outside the rear fixed barrel 16. The outside member is mounted on the rear fixed barrel 16 so that the penetration hole 90 is closed. If the penetration hole 90 is extended to the member disposed outside the rear fixed barrel 16, the penetration hole 90 may be closed by a lid member or the like when the eccentricity adjustment is not carried out.

As illustrated in FIG. 5, each of the ridges 70 of the lens frame 50 in FIGS. 1 and 2 is projected on the outer circumferential surface of the lens frame 50 and formed in the circumferential direction with a certain interval. For example, 9 ridges 70 are provided at positions with 40° azimuth angle intervals when viewed at the center point 0 where the optical axis passes. Also, 9 projections 62 are provided at 40° intervals. Each of the projections 62 is disposed in the middle of the adjacent two ridges 70. The number and the interval of the ridges 70 or the projections 62 formed on the outer circumferential surface of the lens frame 50 are not limited to the numerals described above.

In the descriptions below, the rotation direction of the lens frame 50 in the circumferential direction will be mentioned in the state that the lens frame 50 (the lens barrel 10) is viewed at a rear side. In that state, the clockwise direction (right rotation direction) will be referred to as the "CW" direction. The counterclockwise direction (left rotation direction) will be referred to as the "CCW" direction. The rotation direction when the pressing ring 82 is screwed (engaged) into the outer cylinder 16A of the rear fixed barrel 16 is the CCW direction. The regulated (restrained) rotation direction of the lens frame 50 is the CW direction.

The ridge 70 has a vertical surface 72 formed in the CW direction and a slanted surface 74 formed in the CCW direction when viewed from the inside of the ridge 70 (refer to FIG. 3).

The vertical surface 72 is a plane surface vertical to the outer circumferential surface of the lens frame 50, i.e., a plane surface along the diameter direction. The slanted surface 74 is a plane surface slanted so that the interval with the vertical surface 72 becomes narrowed as the distance from the outer circumferential surface of the lens frame 50 increases. That is, the slanted surface 74 is a plane surface slanted about 45° toward the vertical surface 72 in the direction vertical to the outer circumferential surface of the lens frame 50 based on the position where the outer circumferential surface of the lens frame 50 and the slanted surface 74 are intersected with each other, i.e., a plane surface slanted about 45° in the CW direction assuming that the outward angle in the diameter direction is 0°.

Upon the eccentricity adjustment of the lens frame 50 (the front master lens group 26A), a worker inserts a tool having a leading end part in a flat plate shape such as a minus driver into the penetration hole 90 to engage the leading end part of the tool with the ridge 70 and rotate the lens frame 50 around the optical axis. However, if the leading end part of the tool is engaged with the vertical surface 72 of the ridge 70 so that it is rotated in the CCW direction, the operating force is substantially transferred as the rotating force of the lens frame 50 in the CCW direction. As illustrated in FIG. 1, the front side wall surface 60A of the flange part 60 is pressed onto the front end surface 16C of the inner cylinder 16B of the rear fixed barrel 16 by the plate spring 80. Accordingly, due to the friction force, the lens frame 50 is not rotated unless at least a predetermined level of a rotating force (required rotating force) is applied. However, in this case, the engaged state of the leading end part of the tool and the vertical surface 72 can be easily held. Further, the operating force can be transferred to the lens frame 50 as a rotating force. Accordingly, the lens frame 50 is rotated in the CCW direction by the easy operation. The rotation direction of the lens frame 50 in the CCW direction is the same as the rotation direction when the pressing ring 82 is engaged into the outer cylinder 16A of the rear fixed barrel 16. Accordingly, even if the rotating force of the lens frame 50 in the CCW direction is transferred to the pressing ring 82 through the plate spring 80, the pressing ring 82 is not loosened. Accordingly, the worker can properly carry out the eccentricity adjustment by rotating the lens frame 50 in the CCW direction, which can be easily operated.

If the worker attempts to engage the leading end part of the tool with the slanted surface 74 of the ridge 70 and operate it to be rotated in the CW direction, a part of the operating force is transferred as the rotating force of the lens frame 50 in the CW direction. However, since the leading end part of the tool slides on the slanted surface against the friction force of the slanted surface 74, the engaged state of the leading end of the tool with the slanted surface 74 cannot be held. Accordingly, a small part of the operating force is transferred as the rotating force of the lens frame 50 in the CW direction. As described, the lens frame 50 is not rotated unless at least a predetermined level of a required rotating force is applied. In that case, applying the required rotating force to the lens frame 50 is substantially impossible so that the lens frame 50 is not rotated in the CW direction. The rotation direction of the lens frame 50 in the CW direction is the same as the rotation direction to loosen the screw connection between the pressing ring 82 and the outer cylinder 16A of the rear fixed barrel 16. Accordingly, if the lens frame 50 is rotated in the CW direction, the rotating force is transferred to the pressing ring 82 through the plate spring 80 so that the pressing ring 82 is loosened. However, according to the configuration that has been described, the worker cannot easily rotate the lens frame 50 in the CW direction. The rotation of the lens frame 50 in the CW direction is regulated (restrained), so that the pressing ring 82 is prevented from being loosened.

Next, the penetration hole 90 will be described in detail. The penetration hole 90 is formed with the penetration holes 90A and 90B formed on the outer cylinder 16A and the inner cylinder 16B of the rear fixed barrel 16, respectively, and a cavity part where no member has been originally disposed. As illustrated in FIG. 5, the penetration hole 90 is in a hole shape elongated in the circumferential direction over the range of at least the interval of the two adjacent ridges 70, i.e., a range of at least 40° when viewed at the center point 0 where the optical axis passes (refer to FIG. 4).

If the leading end part of the tool is engaged with the vertical surface 72 of a predetermined ridge 70, which can be seen through the elongated hole, so that the lens frame 50 is rotated in the proper rotation direction, i.e., the CCW direction, even if the ridge 70 reaches the position of the end part of the penetration hole 90 in the CCW direction so that the lens frame 50 cannot be further rotated, another ridge 70 disposed in the CW direction compared to the ridge 70 appears in the range of the penetration hole 90. Accordingly, the leading end part of the tool is engaged with the newly appearing ridge 70 so that the lens frame 50 can be further rotated in the CCW direction.

As the penetration hole 90 is elongated in the circumferential direction, a plurality of ridges 70 can be seen through the penetration hole 90. However, since the penetration hole 90 may cause dusts or others to enter into the fixed barrel 11, it is preferable to make the penetration hole 90 as small as possible. In the embodiment shown in FIG. 4, the penetration hole 90 is formed over a range slightly longer than the interval of the adjacent two ridges 70, i.e., 40°.

The eccentricity adjustment is carried out while the state of image formation is observed by a measuring device such as a collimator, in which the lens barrel 10 is installed after all lenses constituting the optical systems in the fixed barrel 11 of the lens barrel 10 (the focus optical system 20, the zoom optical system 22, the iris 24, and the master optical system 26) are fitted. The eccentricity adjustment is carried out in the state that the member disposed outside the penetration hole 90 in the diameter direction is separated from the rear fixed barrel 16. As to the position of the lens barrel 10 when the lens barrel 10 is installed in the measuring device, the optical axis should be horizontal to the paper surface. Predetermined sites of the lens barrel 10 should be vertically and horizontally predetermined positions. As illustrated in FIG. 5, the lens barrel 10 is installed in the measuring device in the manner that the left and right direction of the paper surface is the direction horizontal to the paper surface, and the upward and the downward of the paper surface are the upward and the downward of the vertical direction (FIG. 4 is a view of the rear fixed barrel 16 viewed at a side of the horizontal direction when the lens barrel 10 is installed in the measuring device). Accordingly, in the state that the lens barrel 10 is installed in the measuring device, the penetration hole 90 shown in FIG. 5 is disposed at an upper side based on the optical axis (the horizontal surface including the optical axis). When the lens barrel 10 is viewed at a rear side in the optical axis direction, the penetration hole 90 is disposed at a left side based on the optical axis (the vertical surface including the optical axis). When the lens barrel 10 is viewed at the center point where the optical axis passes, the penetration hole 90 is disposed at the CCW side based on the direction above the center point 0.

Upon the eccentricity adjustment, the worker obliquely and downwardly sees into the penetration hole 90 from the horizontal side of the lens barrel 10 and inserts the tool into the penetration hole 90 while observing the position of the ridge 70 to engage the tool with the ridge 70. Thereafter, the worker moves the leading end part of the tool substantially in the vertical direction to rotate the lens frame 50. Since the vertical surface 72 of the ridge 70 is standing in the direction vertical to the outer circumferential surface of the lens frame 50 when viewed from the worker, the worker can clearly recognize the vertical surface 72 as the site to be engaged with the leading end part of the tool. The worker performs the usual work operation to vertically (from the upward to the downward) move the leading end part of the tool in the state that the leading end part of the tool is engaged with the vertical surface 72, so that the lens frame 50 can be rotated in the proper rotation direction, i.e., the CCW direction. Since moving the leading end part of the tool from the upward to the downward, rather than from the downward to the upward, is relatively easier, the work for rotating the lens frame 50 in the proper rotation direction, i.e., the CCW direction can be easily performed.

Since the slanted surface 74 of the ridge 70 is nearly in parallel with the vertical direction, the leading end part of the tool cannot be engaged with the slanted surface 74 by the usual work operation to vertically (from the downward to the upward) move the leading end part of the tool, so that the lens frame 50 cannot be rotated in the improper direction, i.e., the CW direction. Since the slanted surface 74 is substantially in parallel with the vertical direction when viewed from the worker, the slanted surface 74 is apparently not the surface to be engaged with the leading end part of the tool. Accordingly, the worker can easily recognize that rotating the lens frame 50 in the improper rotation direction, i.e., the CW direction by moving the tool from the downward to the upward is restrained. Moreover, since moving the leading end part of the tool from the downward to the upward, rather than from the upward to the downward, is unnatural, the worker has no intension to rotate the lens frame 50 in the improper rotation direction, i.e., the CW direction.

In the embodiment that has been described, the rotation of the lens frame 50 in the CW direction is effectively restrained in accordance with the position of the penetration hole 90 as well as the shape of the ridge 70 of the lens frame 50.

In the embodiment that has been described, the slanted surface 74 of the ridge 70 of the lens frame 50 is slanted about 45° to the diameter direction. Of course, however, the slant angle larger than 45° (the angle at which the slanted surface 74 is nearly in parallel with the outer circumference surface of the lens frame 50) is preferable. Even if the slant angle is smaller than 45°, if engaging the leading end part of the tool with the slanted surface 74 to be rotated in the CCW direction is apparently difficult, compared to the case of engaging the leading end part of the tool with the vertical surface 72 to be rotated in the CCW direction, the slant angle is preferable. Even if the vertical surface 72 is not substantially vertical to the outer circumferential surface of the lens frame 50, if the vertical surface 72 can be engaged with the tool, the vertical surface 72 is preferable.

In the embodiment that has been described, the lens frame 50 is pressed by the pressing ring 82 from the front side of the optical axis direction. However, in the structure wherein the optical axis direction in the embodiment is reversed, even if the lens frame 50 is pressed by the pressing ring 82 from the rear side of the optical axis direction, it is possible to restrain the rotation of the lens frame 50 in the direction to loosen the pressing ring 82 screw-connected to the fixed barrel as in the embodiment that has been described. In that case, the restrained rotation direction is the CCW direction, opposite to the CW direction in the embodiment that has been described. Also, the position relation between the vertical surface 72 and the slanted surface 74 of the ridge 70 is reversed. However, the positions of the vertical surface 72 and the slanted surface 74 of the ridge 70 are preferably changed to restrain the rotation of the lens frame 50 in the direction to loosen the pressing ring 82. The position where the penetration hole 90 is formed may be preferably changed to accomplish the same effect as that in the embodiment that has been described. The structure for rotatably supporting the lens frame 50 to the fixed barrel 11 (the rear fixed barrel 16) may not be limited to the embodiment that has been described. If the lens frame can be rotatably supported by sandwiching a predetermined site of the lens frame between the pressing ring screw-connected to the fixed barrel and a predetermined site of the fixed barrel, the present invention can be applied as the eccentricity adjusting mechanism for lenses held by the lens frame.

In the embodiment that has been described, the eccentricity adjusting mechanism for carrying out eccentricity adjustment by rotating the front master lens group 26A around the optical axis has been described. However, the structure of the embodiment that has been described can be applied to the case where the eccentricity adjustment is carried out by rotating a lens frame of other lens groups around the optical axis. Instead of the lens barrel used for an ENG camera in the embodiment that has been described, other types of lens barrels may be used.

DESCRIPTIONS OF REFERENCE NUMERALS 10 lens barrel
11 fixed barrel
12 central fixed barrel
14 front fixed barrel
16 rear fixed barrel
16A outer cylinder
16B inner cylinder
17 moving barrel
20 focus optical system
22 zoom optical system
24 iris
26 master optical system
20A fixed focus lens group
20B moving focus lens group
22A ratio conversion system lens group
22B correction system lens group
26A front master lens group
26B rear master lens group
50 lens frame
52, 54 interval ring
60 flange part
60A front side wall surface
60B rear side wall surface
62 projection
70 ridge
72 vertical surface
74 slanted surface
80 plate spring
82 pressing ring
90, 90A, 90B penetration hole
G1, G2, G3, G3' lens

What is claimed is:

1. A lens barrel having an eccentricity adjusting mechanism, the lens barrel comprising:
   a lens frame that holds a lens for an optical system of the lens barrel;
   a pressing ring that is screw-connected to a fixed barrel of the lens barrel, a part of the lens frame is disposed between the pressing ring and the fixed barrel so that the lens frame is supported to be rotatable around the optical axis;
   an engaging part that is formed on an outer circumferential face of the lens frame and protrudes from the outer circumferential face of the lens frame;
   a tool insertion hole that penetrates from an outside of the fixed barrel of the lens barrel to the position of the engaging part in the diameter direction, and into which a tool is inserted to be engaged with a side face of a circumferential direction side of the engaging part so that the lens frame is rotated around the optical axis and eccentricity adjustment for lenses held in the lens frame is carried out;
   an engaging face that is a side face of the circumferential direction side of the engaging part, is formed in the rotation direction to loosen the pressing ring screw-connected to the fixed barrel, and is engageable with the tool to rotate the lens frame in a rotation direction to tighten the pressing ring; and
   a non-engaging face that is a side face of the circumferential direction side of the engaging part, is formed in the rotation direction to tighten the pressing ring screw-connected to the fixed barrel, and is not engageable with the tool to prevent the lens frame from rotating in the rotation direction to loosen the pressing ring.

2. The lens barrel having an eccentricity adjusting mechanism according to claim 1, wherein the engaging face is substantially vertical to the outer circumferential face of the lens frame, and the non-engaging face is obliquely slanted from a direction vertical to the outer circumferential face of the lens frame.

3. The lens barrel having an eccentricity adjusting mechanism according to claim 1, wherein the non-engaging face is obliquely slanted about 45° from the direction vertical to the outer circumferential surface of the lens frame.

4. The lens barrel having an eccentricity adjusting mechanism according to claim 1, wherein the tool insertion hole is formed at an upper position than the optical axis in the state that the lens barrel is installed in a measuring device for eccentricity adjustment, and a position where the engaging part is moved from an upward to a downward when the lens frame is rotated in the direction to tighten the pressing ring.

5. The lens barrel having an eccentricity adjusting mechanism according to claim 1, wherein the tool insertion hole is formed over the substantially same range as an interval angle of the adjacent engaging parts based on an azimuth angle viewed at a point on the optical axis on a cross-section face vertical to the optical axis.

6. The lens barrel having an eccentricity adjusting mechanism according to claim 1, wherein the engaging part includes a plurality of engaging parts formed in the circumferential direction of the outer circumferential face of the lens frame with predetermined intervals.

* * * * *